W. WRIGHT.
COMPUTING MACHINE AND ATTACHMENT TO TYPE WRITERS.
APPLICATION FILED AUG. 14, 1916.

1,259,579.

Patented Mar. 19, 1918.
4 SHEETS—SHEET 1.

WITNESSES:
Arthur A. Johnson
Julius Duckstine

INVENTOR:
Walter Wright
BY B. C. Stickney
ATTORNEY.

W. WRIGHT.
COMPUTING MACHINE AND ATTACHMENT TO TYPE WRITERS.
APPLICATION FILED AUG. 14, 1916.

1,259,579.

Patented Mar. 19, 1918.
4 SHEETS—SHEET 4.

INVENTOR:
Walter Wright
BY B.C. Stickney
ATTORNEY.

WITNESSES:

UNITED STATES PATENT OFFICE.

WALTER WRIGHT, OF NEW YORK, N. Y., ASSIGNOR, BY MESNE ASSIGNMENTS, TO UNDERWOOD COMPUTING MACHINE COMPANY, A CORPORATION OF NEW YORK.

COMPUTING-MACHINE AND ATTACHMENT TO TYPE-WRITERS.

1,259,579.     Specification of Letters Patent.     Patented Mar. 19, 1918.

Original application filed August 16, 1907, Serial No. 388,766. Divided and this application filed August 14, 1916. Serial No. 114,702.

*To all whom it may concern:*

Be it known that I, WALTER WRIGHT, a citizen of the United States, residing in New York, in the county of New York and State of New York, have invented certain new and useful Improvements in Computing-Machines and Attachments to Type-Writers, of which the following is a specification.

The invention herein disclosed and claimed relates to a computing device which can be attached to any standard typewriting machine, to enable said machine to do the work both of a typewriting and of a computing machine, and as to certain of its features is an improvement upon my prior Patent No. 1,160,102, granted November 9, 1915.

The computing attachment, in the form herein disclosed, is so designed and constructed that it does not interfere in any way with the free use and ease of operation of the typewriter, either when used solely as a typewriter, or for both typewriting and computing. Further, the typewriter to which it is attached is thereby rendered capable of being used not only to perform the functions of a standard adding and computing machine, but also the work of a series of adding and computing machines combined, in connection with the work of a regular typewriter. In fact, it is so constructed that in addition to its work as a typewriter it will perform simultaneously the work of six, eight, ten, or even twenty or more, of such adding and computing machines, and in volume according to the length of the typewriter and computing carriages, or the length of the writing line of the typewriter, whether fitted with the regular or extra width writing carriage. Further, it will compute and retain the totals of each and all columns, limited in number only by the width of said columns and the length of the writing line for which the writing machine is equipped.

One of the objects of the invention is to provide a computing device which can be used for the operation of subtraction as well as addition, and which is therefore provided with means for conveniently and quickly changing from the operation of addition to that of subtraction or conversely, and for setting to zero when desired.

A further object of the invention is to provide a single source of energy for driving both the typewriter carriage and the computing mechanism and to render their movement in response to such source of energy subject to the control of a single set of keys.

A further object is to provide auxiliary means for insuring the completion of the carryover operation throughout the whole series of computing wheels after a computing operation during one journey of the carriage in letter-spacing direction, and before commencing a computing operation during its next journey.

Other features and advantages will hereinafter appear.

In the accompanying drawings,

Figure 1 is a front view of the machine.

Fig. 21 is an enlarged vertical section of the counting mechanism looking from the right.

Fig. 28 is a side view of the same.

Fig. 29 is a broken front view of the counting mechanism to show the transmitting train.

The drawings show the computing mechanism attached to a typewriting machine. This machine may be of any standard construction, but for the purpose of illustration, there is herein shown a "Monarch" machine. It is, however, to be understood that this invention may be embodied in the form of a computing machine complete in itself, and not attached to a typewriting machine.

Figure 3:
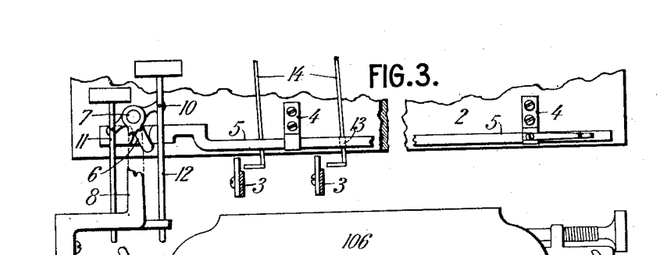
Fig. 3 is an enlarged detail front view of the connecting mechanism.
Figure 4:
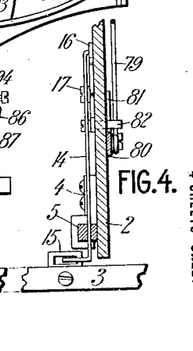
Fig. 4 is a side view, partly in section, thereof.

Attached to the base 1 (Fig. 1) of the typewriting machine is a vertical plate 2 (Figs. 1 and 3) extending longitudinally of the machine over key levers 3, which plate supports the devices for operatively connecting said levers with escapement and controlling mechanism. Secured upon the front side of said plate 2 is a guide 4 for one end of a slide bar 5, the other end of which is attached to an arm 6 secured to a rock shaft 7 having its bearing in a bracket 8 secured to the base 1, said rock shaft having attached thereto crank arms 9, 10, attached respectively to key stems 11, 12. By depressing one or the other of said keys, the shaft 7 is rocked in one direction or the other, and thereby the slide bar 5 is reciprocated.

Figures 5, 6:
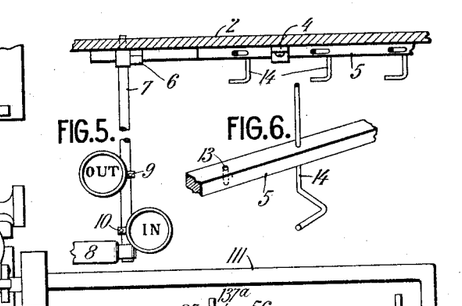
Fig. 5 is a broken plan view of the mechanism for connecting up with the keys.
Fig. 6 is a broken perspective view thereof.

Through apertures 13 (Figs. 5 and 6) in said slide bar 5 pass links 14, one for each numeral key, the lower ends of which links are hook-shaped, and, by the movement of said bar, are adapted to be moved into or out of engagement with apertured collars 15 secured upon the levers of the numeral keys. When moved into engagement with said collars, then, by the pressure of any numeral key, the corresponding link 14 is also depressed. Said link is connected at its upper end to an arm 16 of a bell-crank lever 17, having its bearing in the plate 2, to the end of the other arm of which is connected a wire rod 18, all of said line connecting rods 18 extending longitudinally of the machine and passing through the central opening of a ring 19, (Figs. 13 and 14) secured as hereinafter described, said rods being connected respectively to the ends of levers 20 arranged to swing in radial slots 21 in said ring. It will be seen that, with the above arrangement, by depressing any one of the numeral keys, the outer end of the corresponding lever 20 is moved to the right. The object of this arrangement is to provide a valuating mechanism which will control the extent of operation of the computing mechanism in accordance with the respective values of the numeral keys actuated. This valuating mechanism will now be described.

Secured to the side of the frame of the typewriting machine, (Fig. 7) preferably on the right, is a bracket 24 supporting a vertical plate 25, (Figs. 1, 7, 13 and 14) and secured by means of a cylindrical casing 26 attached to the plate 25 is a vertical plate 27, upon which is secured a cylindrical casing 22 to which is secured the ring 19. Said plate 27 has a circular series of ten apertures 28 which are respectively in alinement with grooves 29 in the periphery of a cylinder 30 secured to said plate 27. In said grooves and through said apertures slide trigger pins 31, their movement to the left being limited by cross pins 32, said trigger pins at the left have formed thereon lateral arms 33, which slide in slots 34 formed in posts 35 secured upon the plate 27, coiled springs 37 around said posts tending to return said trigger pins to the left, that is, to their normal position. When any numeral key is depressed and the outer end of the corresponding lever 20 is rocked to the right, as already described, it impinges upon the beveled end of the trigger pin, moving it to the right. This movement, however, is only an instantaneous one, for as soon as the end of the lever 20 passes the end of the trigger pin, so that the latter is freed from said lever, it immediately returns to its normal position under the action of the coiled spring 37. The necessity for this immediate return will presently appear. Since the trigger pin is confined only by the groove and by the aperture 28 in the plate 27, which aperture is comparatively short, the pin has a certain freedom of movement outward from said groove, and, therefore, when the lever 20 returns upon the removal of pressure from the numeral key, its end can pass the beveled end of the trigger pin, for, by reason of the shortness of the bearing of the pin in its aperture 28, said beveled end can move outward sufficiently to permit this passage to be made.

This instantaneous action of the trigger is for the purpose of propelling the opposite one of a series of stop bolts or pins 40 corresponding to the series of triggers, which bolts slide in a circular series of slideways 41 in a rotary controller or valuating wheel 42, which is secured to a shaft 43 having bearings in the plates 25 and 27. By mechanism which will be presently described, this controller is caused to rotate upon the depression of any numeral key and when this happens the stop bolt 40 which has been so propelled to the right serves to arrest the controller. In order to hold any bolt in the position to which it has been moved, there is provided an annular coiled spring 45, which surrounds the controller and rests in a groove therein and is adapted to engage one or the other of two grooves 46 formed in each bolt.

Figure 25:
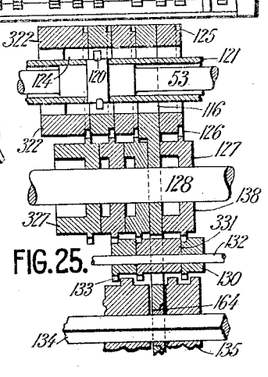
Fig. 25 is a broken vertical longitudinal section.
Figures 26, 27:
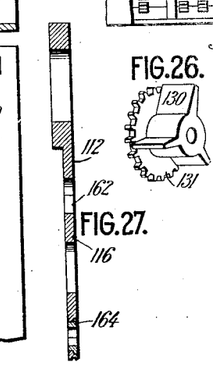
Fig. 26 is a perspective view of one of the pinions.
Fig. 27 is a vertical section of a partition.

53 indicates a shaft, (Figs. 20, 21 and 25) which may be termed the counting shaft, because, in the manner hereinafter described, it rotates the counting wheels, and may also be called the master wheel shaft as will be presently evident. Said shaft has bearings in tubes 121, hereinafter more fully described, secured at their ends in the plate 25 and in a plate 54 supported by a bracket 55 (Fig. 1) secured to the left end of the frame of the machine. Said shaft 53 carries a gear wheel 56 which meshes with a gear wheel 59 which, in turn meshes with a gear wheel 60 which meshes with a pinion 61 on a shaft 62 in a bearing in the plate 25, the other end of said shaft 62 carrying a bevel gear 63, which meshes with a bevel gear 64 (Figs. 1 and 12) loose upon the shaft 65 of an electric motor 66, said latter bevel gear 64 being pressed against a friction disk 67 fast on the shaft of the said motor by a coiled spring 68 interposed between the face of said bevel gear and a head 69 secured upon the end of the shaft 65. This arrangement provides means whereby the shaft of the motor may rotate continuously, in readiness to impart rotation through the bevel gear 63, 64, to the counting or master wheel shaft 53, this rotation being imparted, however, only when said counting shaft is released by certain releasing mechanism. In order to insure the shaft of the motor rotating at a uniform speed, there is provided a governor 70, (Figs. 7, 11 and 12) comprising a ring 71 attached to a second ring 72 secured to the casing of the motor, in which ring 72 rotates a shaft 73 driven by means of a pinion 74 from a gear wheel 75 on the shaft 65, there being pivoted to said shaft 73 three arms 76, which are normally held together by means of a spring 77 around all of said arms. The rotary motion of the shaft 73 causes said arms to swing outward against the action of said spring 77, so that said arms press against the interior of the ring 71 and thus sufficiently retard the motion of the shaft 65.

Figure 2:
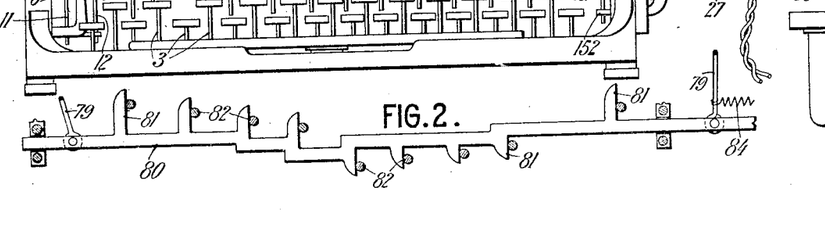
Fig. 2 is a detail view of the universal bar.

The releasing mechanism hereinbefore referred to is operated by the depression of a numeral key, as follows:—Suspended by hangers 79 (Figs. 1 and 2) at the back of the plate 2 is a universal bar 80, having, for each numeral key, a vertical arm 81 which is adapted to be engaged by a pin 82 extending through a slot 83 in said plate 2 from the bell crank lever of the corresponding numeral key. Upon the depression of the numeral key, said pin moves in said slot to the left, and thereby moves said universal bar to the left against the action of a spring 84. Said universal bar is connected by a rod 85 (Figs. 7 and 16) with a crank arm 86 on a shaft 87, mounted in bearings 88 on the plate 25, and on said shaft 87 is carried an escapement. This escapement comprises two disks 89, 90, (Figs. 7, 16, 18 and 19) having cut out of their edges recesses or openings 91, 92, offset from each other, for the purpose of permitting and controlling the passage through them of any one of a series of lugs 93, on an escapement wheel 94, four such lugs being here shown. Said wheel 94, is on a shaft 95 which extends through the plate 25 and carries on the left hand side of said plate a star wheel 96 (Figs. 13, 15 and 17) which acts as a rotary controller stop. It has the same number of points as the lugs 93 on the escapement wheel 94, and these points are adapted, by the rotation of said star wheel, to be brought into the path of one of the bolts 40 extruded from the controller by the operation of a numeral key. Previous to the depression of each numeral key, another bolt 40, which has been so extruded by the next preceding depression of a numeral key, still remains extending out from the controller and in engagement with a point of the rotary stop 96, (Fig. 15) the latter being held from rotating by the pressure of a lug 93 of the escapement wheel 94 against the first disk 89 (Fig. 18) of the escapement. Upon the depression of a numeral key, the crank arm 86 is moved to the left, which causes the disk 89 to rotate through a small angle into a position to permit the lug 93 on the escapement wheel to pass through the opening 91 in the edge of said disk, see Fig. 16. This it immediately does, being actuated so to do by the pressure, against the rotary stop, of a stop bolt 40 which was last operated and this pressure, again, is caused by a rotational force derived from the motor 66 and transmitted to the controller shaft 43 through the double gear wheel 60, 60ª and pinion 97 (Figs. 7, 14) on said shaft 43. Consequently, as regards the counting, the depression of the key accomplishes two results: first, it extrudes from the controller or valuating wheel a stop bolt 40 corresponding to the particular numeral key depressed, and second, it moves the escapement wheel a slight distance past the first lug of the escapement into a position so that the lug thereof which was in engagement with the first disk is now between the two disks of the escapement and pressed against the second disk, and these parts remain in this position until the numeral key is released by raising the finger. As soon as the finger is raised and the key is released, the spring 84 moves the universal bar to the right, thereby moving the crank arm 86 (Fig. 16) to the right, and the upper portion of the escapement to the right; and thereby moving the opening 92 in the second disk of the escapement into such position that the lug upon the escapement wheel can pass through it. The escapement wheel being now perfectly free to rotate, the star wheel 96 no longer resists the pressure from the previously operated stop bolt, but permits the controller to rotate, the escapement wheel also rotating through nearly a quarter of a revolution, until the next lug 93 thereon brings up against the first disk 89 of the escapement, which is now in such a position that the lug cannot pass through the opening 91. With this movement of the escapement through a quarter of a revolution, the rotary stop or star wheel also moves a quarter of a revolution, so that the next point thereon arrives at such a position as to arrest the stop carried by the controller, and which has been extruded therefrom by the depression of the numeral key just operated. The extent of rotation of the controller depends upon the annular position of the stop bolt 40 which arrests it, and this again depends selectively upon the numeral key, the depression of which has extruded said bolt. Corresponding to a given extent of rotation of the controller, the counting shaft 53 is also rotated, and as hereinafter described imparts rotation to the counting mechanism. It will now be seen why it is necessary that any trigger, when operated to propel the stop bolt, should return immediately after effecting such propulsion. For if not so returned, it would be in the way of the rear end of the next stop bolt of the controller, and prevent said controller rotating.

As the controller rotates, the stop bolt 40 which previously engaged the star wheel, and has been permitted to pass the same engages the face of a wedge 98 extending inwardly from the plate 25, and is, by the said wedge, returned to its normal position in the controller ready for subsequent use.

The two disks 89 and 90 are secured adjustably by means of set screws upon the shaft 87, to permit the escapement to be used with the action of any particular typewriter; so that the controller can be released either on the downward stroke of the key, or on the return thereof.

Figures 7, 8, 9, 10, 11, 12:
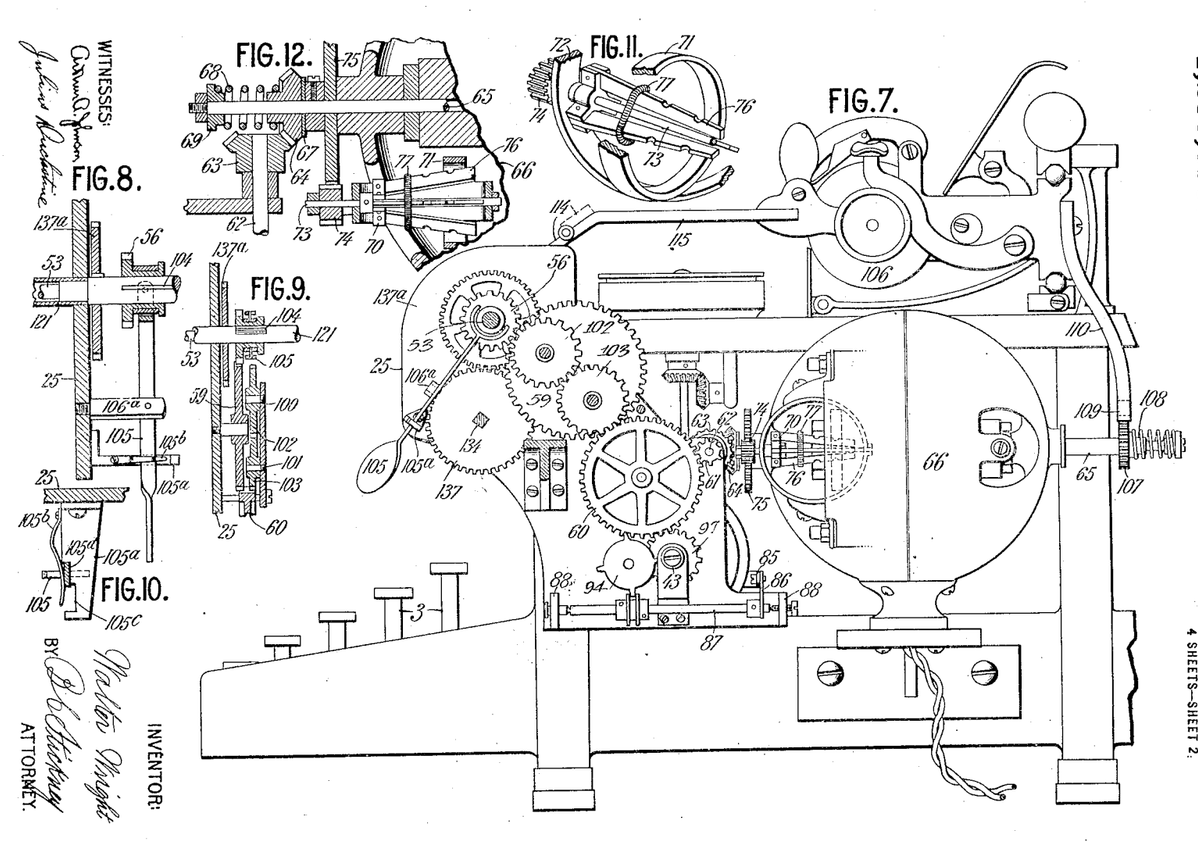
Fig. 7 is a side view of the machine.
Fig. 8 is an enlarged vertical section showing the shifting mechanism.
Fig. 9 is a similar section showing the subtracting mechanism.
Fig. 10 is a detail cross section of the shifting mechanism.
Fig. 11 is a broken perspective view of the governor.
Fig. 12 is a broken sectional view of a motor, showing a portion of the governor.

Mechanism is provided whereby the apparatus may be used to perform the operation of subtraction, instead of that of addition, or conversely (Figs. 7, 8 and 9). For this purpose there is arranged over the wheel 59 a plate 100 (Fig. 9) attached to the plate 25; and screwed into said plate 100 are pivots 101 for two small intermediate gear wheels 102, 103 meshing with each other, the gear wheel 103 meshing with the gear wheel 60 and the gear wheel 102 meshing with the gear wheel 56. The gear wheel 60 is of sufficient width to engage both the gear wheel 59 and the gear wheel 103 at the same time, so that both of them are driven in the same direction. Consequently, the gear wheel 102 rotates simultaneously with the gear wheel 59, but in the opposite direction thereto. The gear wheel 56 can engage either the gear wheel 59 or the gear wheel 102, but not both at the same time. Said gear wheel 56 is formed with a collar, slidable upon the shaft 53 but rotatable therewith by means of a key-way and a key 104 in the usual manner, and it is moved longitudinally upon its shaft by means of a lever 105 pivoted upon a post 106$^a$ (Figs. 1, 7 and 8).

From the above construction it results that, by moving the lever 105 along the guide arm 105$^a$ into one of its positions of rest (in one of the two seats 105$^c$, 105$^d$), the operation of addition is performed by the counting shaft, while when the lever is in the same position, the counting shaft turns in the reverse direction, and the operation of subtraction is performed thereby, the lever being held in either seat by the spring 105$^b$ (Figs. 8 and 10).

This part of the mechanism, which enables a rapid change to be made from the operation of addition to that of subtraction, also furnishes an easy and convenient method of resetting all the counting wheels to zero, after either addition or subtraction. Thus, when it is desired to reset the counting or computing wheels to zero, the operator should shift the lever 105 to throw in the subtracting mechanism, if it is not already in, and then strike the numeral keys in succession corresponding to the figures which successively appear at the printing point of the typewriter. Obviously, this has the effect of bringing all the counting wheels to zero.

This part of the mechanism also provides a convenient method of correcting errors in addition or subtraction caused by striking the wrong numeral key. For this purpose the carriage is moved back one space in the same way as an operator moves it back to change an error in typewriting, then the lever 105 is shifted, which reverses from addition to subtraction or conversely, then the operator again strikes the same numeral key which was struck instead of the correct key, and this causes the total of addition or subtraction to be the same as it was before said key was struck. Then the operator erases from the sheet the numeral which was so erroneously written by the typewriting machine, and again shifts the reversing lever, and the machine is then in readiness to add or subtract the correct number. This operation occupies but little more time than the correction of a similar error in ordinary typewriting.

The motor 66 (Figs. 1 and 7) may also be employed, if desired, to advance the typewriter carriage 106. For this purpose, there is provided, on the rear end of the motor shaft 65, a pinion 107 connected to said shaft 65 by a friction transmission 108 precisely like that connecting the front end of said shaft with the bevel gear 64. This pinion engages a rack 109, which forms the lower member of a yoke 110, the upper horizontal member 111 being attached to the typewriter carriage. It is obvious that with this arrangement the motor takes the place of the spring generally employed for advancing the typewriter carriage.

The computing carriage 112 (Figs. 1 and 22) comprises end plates 113 which are removably engaged by fingers 114 pivoted to arms 115 which extend from the carriage of the typewriting machine. Thereby said computing carriage moves with the typewriter carriage, except when said fingers are raised out of engagement with the carriage 112. It also has vertical partitions 116 (Fig. 1) which are arranged at regular intervals, two of which partitions extend downward to carry a yoke 117 in which is journaled a wheel 118 which runs upon a fixed rail 119 attached to the brackets 24, 55 and thus removes the weight of the carriage from the shaft 53, and also from a shaft 134, hereinafter referred to.

Figures 13, 14, 15, 16, 17, 18, 19, 20:
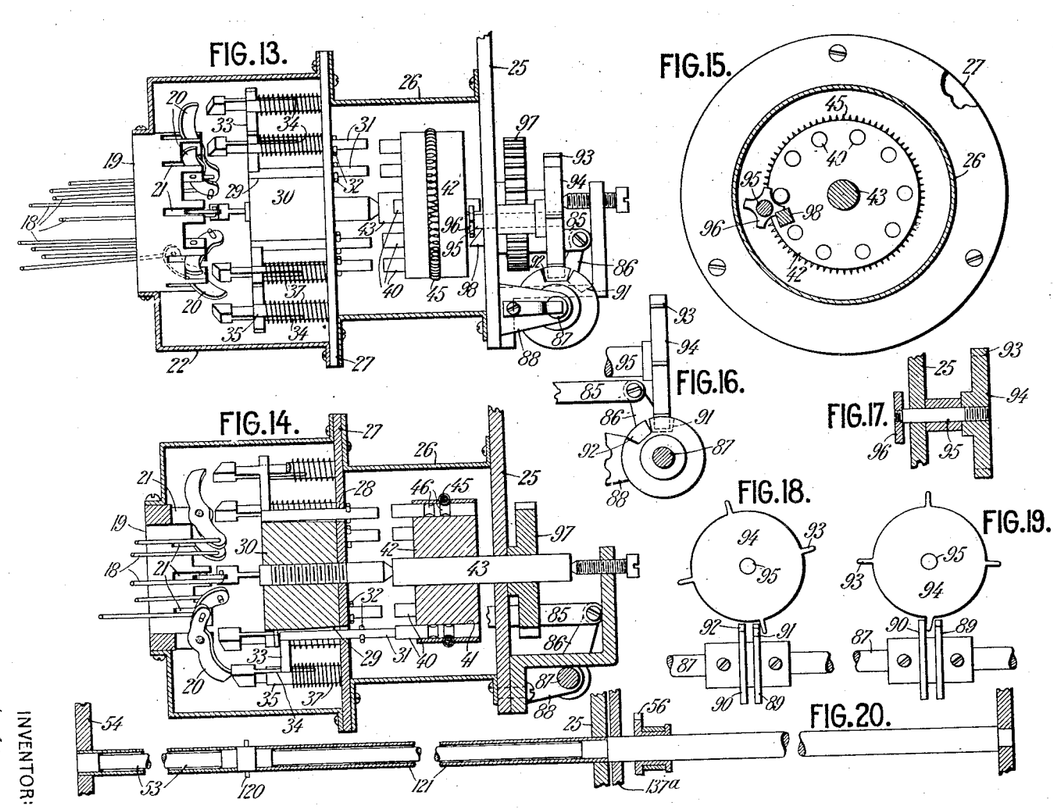
Fig. 13 is a side view, partly in section, of the rotary controller.
Fig. 14 is a longitudinal section of the same.
Fig. 15 is a cross section of the mechanism shown in Fig. 13, taken close to the supporting plate.
Fig. 16 is a broken detail front view of the escapement mechanism, in a different position from that shown in Fig. 13.
Fig. 17 is a sectional view of the same.
Figs. 18 and 19 are front views in two different positions of the escapement mechanism.
Fig. 20 is a longitudinal sectional view, partly in side elevation, of the counting shaft.
Figure 22:
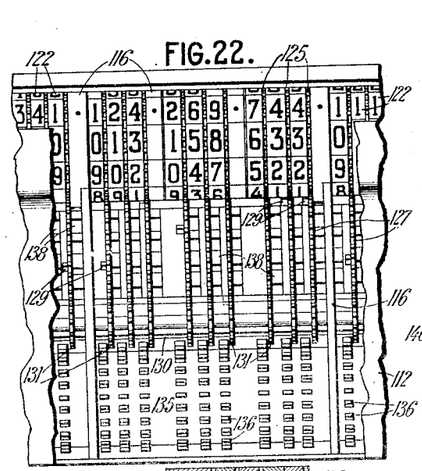
Fig. 22 is a broken front view of a portion of the same.

Referring to Figs. 20, 21 and 22, it will be seen that the counting or master shaft 53 is surrounded and supported by two tubes 121 supported by the end plates 25 and 54 and extending inwardly toward each other. Intermediate these tubes there are secured to the shaft 53 one or more teeth 120, two being shown, which form a master wheel or actuator for rotating individually a series of counting or computing wheels 122 supported on the tubes 121. These counting wheels can thus move longitudinally on said tubes and can also rotate thereon, when advanced or retracted by progressive addition or subtraction. The interposition of the tubes 121 between the wheels 122 and the shaft 53 has the effect of eliminating any tendency of said wheels to turn owing to the rotation of said counting shaft 53, the only counting wheel so affected by such rotation being that immediately over the teeth 120, and therefore at the writing point of the typewriter. It also avoids wear on the internal gear teeth of the counting wheels (hereinafter described) which would be caused by the counting shaft turning in contact therewith.

The counting shaft is reduced in diameter except at the portions adjacent to the ends of the tubes, thus greatly reducing the friction, since there is no friction of said shaft in said tubes except at the narrow bearings at the ends thereof. This construction has the additional advantage that fine dust, which might settle and accumulate between the counting shaft and the tubes, will produce no effect in increasing the friction of the shaft within the tubes.

Figure 23:
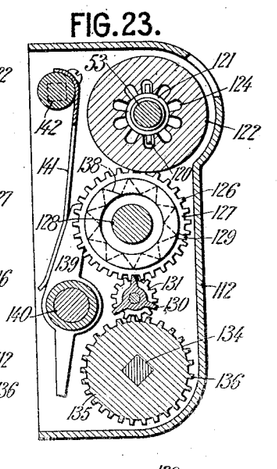
Fig. 23 is a view similar to Fig. 21, looking to the left.
Figure 24:
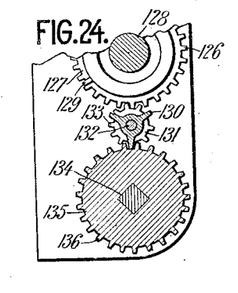
Fig. 24 is a broken view similar to Fig. 23, showing the parts in a different position.

Each counting wheel 122 is formed with internal gear teeth separated by ten recesses or notches 124, and, as the typewriter carriage moves to the left, a pair of opposite notches in each counting wheel is, in succession, brought into engagement with the two teeth 120 on the counting shaft, no matter in what angular position said teeth were left by the last preceding operation. Consequently, when the counting shaft is rotated by the mechanism heretofore described, upon the depression or release of any numeral key, the counting wheel which is at the center of said shaft and at the writing point of the typewriter is correspondingly rotated. Each counting wheel has formed on its periphery the ten digits "0" to "9," and is formed on the right hand side with narrow external gear teeth 125 which mesh with similar teeth 126 at the center of a gear wheel 127, all of said wheels 127 turning loosely on a shaft 128. It may be here noted that it is immaterial which of these series of wheels 122, 127, is driven directly, and which of them are idler wheels, and I reserve the right to use either construction. Each wheel 127 has formed on the left hand side a single lug 129, (Fig. 23) which, in each revolution of the wheel 127, is adapted to engage one of three arms 130 (Figs. 23, 25, 26 and 29) on the right side of a transfer pinion 131, all of said pinions 131 turning loosely on a fixed shaft 132. Each pinion 131 is formed on the left with teeth 133 which engage the teeth 126 of the next wheel 127 to the left. The circumferential distance between the arms 130 being the same as that corresponding to one-tenth of the circumference of the wheel 127, it would follow that, if the pinion 131 were, by the lug 129, advanced through one-third of a revolution, this would cause the next wheel 127 on the left to advance one-tenth of a revolution, and would correspondingly advance the next wheel 122 on the left, thus bringing the next numeral on said counting wheel into a position to be viewed by the operator.

In order to insure that the pinion 131 is thus advanced through one-third of a revolution to advance the counting wheel one-tenth of a revolution, there is provided a transfer shaft 134 (Figs. 1, 7, 21, 23, 24, 25, and 29) which is preferably square, and on this shaft are arranged a series of cylinders 135, (Fig. 22) one for each section of the computing carriage between the partitions 116, so that said cylinders can slide on, and rotate with, said shaft 134. Said cylinders are herein shown as moving with the carriage, so that they slide on the shaft 134, but this longitudinal movement of these cylinders is not essential. On each cylinder are formed circular series of teeth 136, the teeth of any series being arranged to engage an arm 130 of the corresponding pinion 131 only when said pinion has been turned by means of the wheel 127. The wheel turns the pinion sufficiently to bring an arm 130 into a position to be engaged by the teeth 136, which then completes the advance of said arm 130, but moves said pinion into such a position that its arm cannot be again engaged by the teeth 136 until said pinion has again been advanced by the lug 129 on the wheel 127.

It will be seen that the rotation of the shaft 134 (Figs. 1, 7 and 21) should be in the opposite direction to that of the shaft 53, and to effect this result, there is secured upon the end of the shaft 134 a gear wheel 137 meshing with a gear wheel 137$^a$ of the same diameter, so that the shaft 134 rotates at the same speed as the shaft 53.

The wheels 127 are provided on the right hand side with locking teeth 138 (Figs. 21 and 29) which are engaged by angular-nosed dogs 139 carried upon a longitudinal rod 140 and pressed against said teeth by springs 141, all secured upon a longitudinal rod 142. The angular form of the nose of each dog permits any counting wheel to be advanced in either direction by the pressure of the tooth 138 against an edge of the nose without providing extraneous means for withdrawing the dog from said locking teeth. If preferred for rapidity of action, the dogs may be positively withdrawn in succession from their corresponding teeth, as they pass the writing point, this being effected by means of a roller carried at said writing point and engaging an arm attached to each dog.

It has heretofore been common to limit the number of operatively connected counting wheels to use in separate boxes or sections, generally limited to eight or ten counting wheels to a box or section, but while I reserve the right to use separate and independent sections, I use and have shown herein counting wheels operatively connected for the whole width of the typewriter carriage, as if there were a single such assemblage for the entire length of 80 or more typewriting spaces. It is possible with this construction for a large number of counting wheels to stand at the numeral "9", and if an addition is then made to the last wheel so standing, this counting wheel, in advancing to perform the operation of addition, has also to advance through one-tenth of a revolution each of the consecutive wheels to the left, so standing at "9". Should all the wheels, 80 or more in number, be so standing at "9", the advancement of all these accumulating wheels in the usual manner would put a very heavy and excessive load upon the counting wheel operated, and also upon the mechanism for driving the same; and in order to give the machine unlimited capacity, and to prevent any excessive strain or load upon the mechanism, it is preferred to use the transfer shaft 134, and thereby obtain a running action. This transfer shaft extends the full length upon the operation of any numeral key. It is therefore obvious that if there are any of the arms 130 of the several transfer wheels in the position to be advanced, that the same will be advanced by the turning of said transfer shaft and the wheel corresponding thereto advanced one-tenth of a revolution. It will be observed that the work of the transfer shaft upon a series of consecutive pinions 131 corresponding to counting wheels standing at "9" is not performed simultaneously for all of them, but in succession on said pinions in the order from right to left. That is to say, as each wheel in turn is moved into position "0", it sets the transfer pinion of the next wheel which is then advanced by the transfer shaft, and thus sets the next counting wheel at "0", and so on through the entire series. By thus distributing the load and dividing it into a series of successive and almost instantaneous actions, instead of requiring the whole of the work to be done instantaneously in a single movement, the strain is taken off the mechanism, and it is possible to throw an unlimited number of such wheels from the position showing "9" to the position showing "0".

In order to provide for the rotation of the transfer shaft, should it be desired at any time, without the striking of a numeral key, there is provided a clearance key 150, Fig. 1, which is attached to a vertical slide piece 151, the lower end of which slides in a guide 152, while the upper end is slotted, and in said slotted end 153 is a pin on one arm of a bell-crank lever 154, the other arm of which is attached by a wire 155 to a third arm 156 on the bell crank 17 corresponding to the numeral key "9". The upper end of the link 14 of this numeral key is formed in an elongated slot 157 connected to the arm 16 of the rock shaft, so that the clearance key can be operated without operating the numeral key "9" on the lever connected therewith. The effect of operating the clearance key is therefore (Fig. 1) precisely the same as the effect of operating the numeral key "9" so far as the counting mechanism is concerned, the only difference being that no printing is done and that the type-bar and lever on the typewriting machine are not operated. This clearance key should never be operated except at the end of the line or when the carriage is at such a point that one of the partitions or the blank part of a double wheel is at the typewriting point of the carriage, in which case the counting shaft can rotate without operating the counting wheel or causing any rotation of the counting wheel at the writing point or changing the total of the addition in any way, except to throw each wheel to the left of the writing point as may not have been thrown by the last operation of the numeral key.

Before writing the total of any column or columns of figures, the operation of the clearance key will always insure that all the transfers have been made and the total is absolutely correct. Therefore, to give the machine unlimited capacity and elasticity in its operation, and also the additional convenience and advantage of being able to write the maximum number of columns, in proportion to their width capable of being separated on the paper according to the number of writing spaces of the typewriter, the counting wheels are divided into groups of three, each such group being divided from the next by a regular typewriting space, yet operatively connected therewith, and capable of transferring the accumulations of ten, through or past said space to the first wheel of the next group of three counting wheels, and this principle is employed for the whole length of the writing line of the typewriter.

In the ordinary typewriter there are eighty writing spaces to the line; therefore the equipment of the ordinary machine, for this width of writing space, with a computing carriage containing computing wheels to correspond therewith, would enable it to be used upon twenty individual and separate columns, each limited to "999" or upon ten colmns limited to "999,999" or upon five columns of twice that width, and so on. It will therefore be observed that with this construction it is possible to utilize the writing space of the typewriter to fit any particular kind of work, either for a single wide column the entire width of the typewriter, or as many as twenty narrow columns (on an ordinary machine), or other intermediate arrangements of columns between the above. This idea can also be applied to an extra wide typewriter carriage, where the writing line is two hundred or more spaces just as easily as to the ordinary width machine.

The machine is therefore rendered capable of computing columns with small totals without taking up more space than is actually required, or of adding a column of figures containing as many figures as there are spaces on the typewriter less the decimal or dividing spaces between the hundreds and thousands, and so on, and which are provided for in the following manner:

The computing carriage is so made that each fourth typewriting space of the typewriter can be used for writing a comma or period, without operating or affecting in any way the computing mechanism, the latter being so made that it carries and accumulates through said space, just the same as if it were not there. Each fourth space can also be used for spacing or pointing off the thousands, millions, billions, and so on, or left blank for dividing the total of one column from that of another, in which case the comma or period is not written, and for which dividing slides 166 (Fig. 1) are provided which are moved to cover such fourth spaces.

As shown in the drawings all the regular computing wheels are of identically the same width as the typewriter writing space. The arrangement of the counting wheels of the computing mechanism into groups of three uniform counting wheels, capable of being operated in connection with, and carrying forward accumulations of ten to the first wheel of the next series of three counting wheels, is arranged and provided for in one of the two following methods: First, by making each third counting wheel of the series two typewriter writing spaces in width (Figs. 22, 25 and 27), instead of one, but so constructed that said extra width is merely a hollow shell, which allows the pins of the counting shaft to pass therethrough and revolve therein, if desired, without operating the computing wheels or affecting the same in any way through the revolution of the counting shaft. Second, by vertical partitions in the computing carriage, which occupy said fourth writing spaces of the typewriter, and act as divisions of the counting wheels into groups of three or multiples of three. These vertical partitions occupy the space which would be occupied by a fourth computing wheel, if there were a computing wheel made for each writing space of the typewriter. They may be used in every fourth space of the typewriter, or in such fourth spaces as may be desired, wherever it is preferred to use them rather than to make the third wheel of any group of a double width, as already explained. When vertical partitions are used, the partitions are so arranged that the accumulations of ten are carried through said partitions, and transferred in the regular manner to the first wheel of the next group of three counting wheels, exactly as they are carried and transferred from one to the other in each regular group of three counting wheels. The counting wheels of the group of three, when these vertical partitions are used, are of identical and uniform width and construction, except for the small transfer wheel, the particular arrangement of which is more fully explained in connection with the construction of the accumulating or computing mechanism.

A double width computing wheel is shown at 322 (Fig. 25); a double width gear wheel at 327; and a double width pinion at 331. It is to be observed that the transfer from one set of wheels to the next takes place only through the transfer pinion, and it is therefore necessary that this pinion should only extend through the partitions. The opening 160 (Figs. 25, 27 and 28) in the partition is therefore made large enough to permit the transfer pinion to extend therethrough. The opening 270 through which passes the counting shaft is made sufficiently large for the pins on said shaft to pass through and revolve therein. The opening 162, for the shaft 128 is merely of sufficient size to allow said shaft to pass therethrough. In the opening 163 for the square transfer shaft are placed bushings 164 which fit snugly around said shaft, to turn in said opening.

The above arrangement provides for the divison of a row of figures into groups of three, universally adopted, except in regard to columns of figures representing money. In the latter case, there are only two figures used to represent the cents, the figures representing mills not being generally used. In order to separate from each other the several columns which are being added at the same time, and to render the totals of said columns easily readable from the figures of the counting wheels displayed, the adjustable slides 166 (Fig. 1) are used. When adding columns of figures representing money, each slide 166 is arranged to cover the third figure of that group of three figures of which the first two show the cents in said money column. It will thus be seen that said slide pieces serve a double purpose, to form distinct marks of separation between the totals of ordinary columns, so as to prevent an error being made in misplacing horizontally the total read from any column; and also to prevent confusion in reading the totals of money figures, by causing only two figures to be shown in the cents column.

Of course it is to be understood that whenever described the partition may be omitted and one of the wheels adjacent thereto may have its width correspondingly increased in order to carry the period or comma.

This application is a division of my co-pending application, Serial No. 388,766, filed August 16, 1907, and no claims will be made in that application for the subject-matter claimed in this.

Variations may be resorted to within the scope of the invention, and portions of the improvements may be used without others.

Having thus described my invention, I claim:

1. In a combined adding and typewriting machine, the combination with a typewriting mechanism, including a carriage, of a series of computing wheels connected to travel with said carriage, a source of power, connections from said source of power, one for advancing the carriage, and another for rotating computing wheels, means for transmitting motion from the latter connection to computing wheels of the series as they are successively brought into coöperative relation therewith by their travel with the carriage, numeral keys controlling the travel of said carriage, and means actuated by the operation of any numeral key for controlling the rotation of said computing wheels.

2. In an apparatus of the character described, the combination with a typewriting machine having a carriage, computing wheels, and keys for controlling both the travel of the carriage and the movements of said computing wheels, of a unitary source of power for advancing said carriage and also for rotating said computing wheels, subject to the control of said keys.

3. In an apparatus of the character described, the combination with a typewriting machine having a carriage, computing wheels, and keys for controlling both the travel of the carriage and the movements of said computing wheels, of a unitary source of power for advancing said carriage and also for rotating said computing wheels subject to the control of said keys, and means for reversing the direction of rotation of the computing wheels, the advance of the carriage being independent of the direction of rotation of the computing wheels.

4. In an apparatus of the character described, the combination with type bars, and means for operating the same, of a movable paper carriage, a source of energy for advancing said carriage, and computing wheels rotated by said source of energy and forming part of a computing mechanism, the advance of the carriage and rotation of the computing wheels being subject to control by said type-bar operating means.

5. In an apparatus of the character described, the combination with type bars, and means for operating the same, of a carriage, computing mechanism, an original source of power, and means communicating with said source of power and controlled by said type-bar operating means, both to advance said carriage and actuate said computing mechanism.

6. In an apparatus of the character described, the combination of computing wheels, a computing shaft, means for operatively connecting said wheels in succession with said shaft, a motor for rotating said shaft, a governor for equalizing the speed of said motor, an operative connection between said motor and shaft including friction devices, means for arresting the movement of said shaft while said motor is still in movement, a series of numeral keys, and means, actuated by the movement of a numeral key, for withdrawing said arresting means to permit the shaft to be rotated by the motor.

7. The combination with a typewriter comprising a carriage and type-controlling numeral keys, of a computing device comprising computing wheels and a master wheel relatively movable with respect thereto in accordance with the travel of the carriage to engage and operate the computing wheels *seriatim*, a single source of energy for both moving the carriage and rotating the master wheel, and means for rendering such movement and rotation subject to the operation of said numeral keys.

8. The combination with a computing head, of a source of power for actuating certain parts of said computing head to accumulate a calculation, means for controlling the actuation of said certain parts by said source of power, and connections enabling the activity of said source of power while said certain parts of said computing head remain passive, and a governor for controlling the activity of said source of power to balance the action thereof during effective and ineffective periods.

9. In a computing device, the combination with a series of computing wheels, and an actuator to operate them *seriatim*, of means operated upon the arrival of each computing wheel at a certain point in its rotation for initiating a one-step carry-over movement of the next computing wheel of the series, an assisting device coöperating with said initiating means to complete the carry-over movement, and key-controlled driving means common to the actuator and assisting device.

10. In a computing device, the combination with a series of wheels, of a series of transfer pinions for transferring from each wheel to the next of the series, each transfer pinion having gear teeth and each of said wheels also having gear teeth meshing with those of the transfer pinion, each transfer pinion also having arms and each wheel having a lug adapted in one revolution of said wheel to engage one of said arms, and thereby move said pinion.

11. In a computing device, the combination with a series of wheels, of a series of transfer pinions for transferring from each wheel to the next of the series, each transfer pinion having gear teeth and each of said wheels also having gear teeth meshing with those of the transfer pinion, each transfer pinion also having arms and each wheel having a lug adapted in one revolution of said wheel to engage one of said arms, and thereby move said pinion, each wheel also having a series of notches, and a spring actuated dog having a nose adapted to engage said notches to center the wheel, the notches and nose being formed to permit the wheel to be moved in either direction, substantially as described.

12. In a computing device, the combination with a series of wheels, of a series of transfer pinions for transferring from each wheel to the next of the series, each transfer pinion having gear teeth and each of said wheels also having gear teeth meshing with those of the transfer pinion, each transfer pinion also having arms and each wheel having a lug adapted in one revolution of said wheel to engage one of said arms, and thereby move said pinion, each wheel also having a series of notches, a spring-actuated dog having a nose adapted to engage said notches to center the wheel, the notches and nose being formed to permit the wheel to be moved in either direction, and a transfer wheel adapted to engage an arm of the corresponding transfer pinion when said pinion is so moved by said lug, substantially as described.

13. The combination with computing wheels, an actuator therefor, and carry-over initiating devices, of a carry-over assisting device to complete the operation of the initiating devices, driving means for the actuator, driving means for the carry-over assisting device, and a reversing mechanism common to both said driving means.

14. The combination with a series of numeral keys, reversible computing wheels controllable thereby *seriatim*, and carry-over trains for said computing wheels, of power-driven means for operating said computing wheels subject to the control of said keys, and power-driven means for concomitantly operating said carry-over trains, a part of said power-driven means being common to both devices and including a reversing mechanism.

15. The combination with a series of computing wheels, of means for running up numbers in said computing wheels digit by digit, tens-carrying mechanism for said computing wheels, a boosting device driven from the source that drives said computing wheels to assist in the carry-over operation, said boosting device being effective upon the turning of each computing wheel to zero position and before the running up of the next digit, and a single reversing device to determine the direction of rotation of both the computing wheels and the boosting device.

16. The combination with a series of digit wheels, a master wheel therefor, and means for enabling the master wheel to drive the digit wheels *seriatim*, of carry-over devices whose movements are initiated by the digit wheels, a revoluble driving device extending along the carry-over devices and having means to act thereon concomitantly with the operation of said digit wheels, to assist the carry-over devices in effecting carry-over operations, and means for imparting a supplemental rotation to said assisting device independently of said digit wheels for insuring the completion of the carry-over operations.

17. In a computing device, the combination with computing wheels, a master wheel, and means for causing the master wheel to be brought into successive engagement with the computing wheels and to be disengaged therefrom, of carry-over initiating devices for the computing wheels, a carry-over assisting device to complete the operation of the initiating devices, means for rotating the master wheel and the carry-over assisting device during engagement between the master wheel and any computing wheel, and key-controlled means for causing said rotating means to impart an additional rotation to the assisting device when the master wheel is out of engagement with the computing wheel.

18. In a combined typewriting and computing machine, the combination with a typewriter having a carriage and numeral keys, of computing mechanism comprising computing wheels and a master wheel, means controlled by the movement of the carriage for causing the master wheel to successively engage the computing wheels and to be disengaged therefrom, carry-over initiating devices for the computing wheels, a carry-over assisting device to complete the operation of the initiating devices, means controlled by the numeral keys to rotate the master wheel and the carry-over assisting device during the engagement between the master wheel and any computing wheel, and a clearance key to cause said rotating means to impart an additional rotation to the assisting device when the master wheel is out of engagement with the computing wheels.

WALTER WRIGHT.

Witnesses:
 JULIUS DUCKSTINE,
 EDITH B. LIBBEY.

Copies of this patent may be obtained for five cents each, by addressing the "Commissioner of Patents, Washington, D. C."